United States Patent
Yao et al.

(10) Patent No.: US 11,354,417 B2
(45) Date of Patent: *Jun. 7, 2022

(54) ENHANCED SECURE BOOT

(71) Applicant: McAfee, LLC, San Jose, CA (US)

(72) Inventors: Jiewen Yao, Shanghai (CN); Rangasai V. Chaganty, Hillsboro, OR (US); Xiang Ma, Portland, OR (US); Ravi Poovalur Rangarajan, Portland, OR (US); Rajesh Poornachandran, Portland, OR (US); Nivedita Aggarwal, Portland, OR (US); Giri P. Mudusuru, Portland, OR (US); Vincent J. Zimmer, Vincent, WA (US); Satya P. Yarlagadda, Bangalore (IN); Amy Chan, Taipei (TW); Sudeep Das, Santa Clara, CA (US)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,801

(22) Filed: Jan. 4, 2021

(65) Prior Publication Data

US 2021/0124829 A1 Apr. 29, 2021

Related U.S. Application Data

(63) Continuation of application No. 16/336,422, filed as application No. PCT/CN2016/100172 on Sep. 26, 2016, now Pat. No. 10,885,199.

(51) Int. Cl.
*G06F 21/00* (2013.01)
*G06F 21/57* (2013.01)

(52) U.S. Cl.
CPC .......... *G06F 21/575* (2013.01); *G06F 21/572* (2013.01); *G06F 21/577* (2013.01); *G06F 2221/033* (2013.01); *G06F 2221/2149* (2013.01)

(58) Field of Classification Search
None
See application file for complete search history.

(56) References Cited

U.S. PATENT DOCUMENTS 8,873,747 B2  10/2014  Polzin et al.
10,885,199 B2  1/2021  Yao et al.
(Continued)

FOREIGN PATENT DOCUMENTS

CN  101014923  8/2007

OTHER PUBLICATIONS

Yao et al., "A Tour Beyond BIOS Creating the Intel Firmware Suppod Package (2.0) with the EFI Developer Kit II," White Paper, May 2016, 36 pages.
(Continued)

*Primary Examiner* — Maung T Lwin
(74) *Attorney, Agent, or Firm* — Hanley, Flight & Zimmerman, LLC

(57) ABSTRACT

A disclosed example apparatus includes memory; and at least one processor to execute first instructions, the first instructions obtained from first encrypted firmware, the at least one processor to: encrypt handoff data with an original equipment manufacturer key to generate encrypted handoff
(Continued)

data; decrypt second encrypted firmware based on the original equipment manufacturer key to generate second instructions; and provide access to the encrypted handoff data to the second instructions, the second instructions to perform initialization of a computer based on the handoff data obtained from the encrypted handoff data.

20 Claims, 4 Drawing Sheets

(56) References Cited

U.S. PATENT DOCUMENTS

| | | |
|---|---|---|
| 2002/0166062 A1 | 11/2002 | Helbig, Sr. |
| 2003/0191955 A1 | 10/2003 | Wagner et al. |
| 2005/0021968 A1 | 1/2005 | Zimmer et al. |
| 2006/0059372 A1 | 3/2006 | Fayar et al. |
| 2009/0094597 A1 | 4/2009 | Moskalik et al. |
| 2013/0232344 A1* | 9/2013 | Johnson ............... G06F 21/645 713/193 |
| 2014/0351584 A1* | 11/2014 | Checcucci ............... G06F 8/61 713/164 |
| 2015/0121070 A1 | 4/2015 | Lau et al. |
| 2015/0161392 A1 | 6/2015 | Krummel |
| 2016/0300064 A1 | 10/2016 | Stewart et al. |
| 2017/0024570 A1* | 1/2017 | Pappachan ............ G06F 21/602 |
| 2017/0286686 A1 | 10/2017 | Gefflaut et al. |

OTHER PUBLICATIONS

Yao et al., "A Tour Beyond BIOS Using the Intel Firmware Support Package (2.0) with the EFI Developer Kit II," White Paper, May 2016, 23 pages.

Heasman, "Hacking the Extensible Firmware Interface," Blackhat USA, Las Vegas, Jul. 28-Aug. 2, 2007, 41 pages.

Theopolis, "UEFI Firmware Parser," GITHUB, available Feb. 2016 at <https://github.com/theopolis/uefi-firmware-parser/tree/e6f122a500e9d7c5d9a34d7e367393fea4257c02>, 5 pages.

Porst, "Applications of the Reverse Engineering Language REIL," Hackers to Hackers Conference 2009, Sao Paulo, 2009, 39 pages.

International Searching Authority, "International Search Report," dated Jul. 12, 2017 in connection with International Patent Application No. PCT/CN2016/100172, 3 pages.

International Searching Authority, "Written Opinion," dated Jul. 12, 2017 in connection with International Patent Application No. PCT/CN2016/100172, 3 pages.

United States Patent and Trademark Office, "Notice of Allowance," dated Sep. 9, 2020 in connection with U.S. Appl. No. 16/336,422, 14 pages.

\* cited by examiner

ENHANCED SECURE BOOT

RELATED APPLICATIONS

This patent arises from a continuation of U.S. patent application Ser. No. 16/336,422, filed on Mar. 25, 2019, entitled "Enhanced Secure Boot," which is a National Stage Entry of International Patent Application No. PCT/CN2016/100172, entitled "Enhanced Secure Boot," filed on Sep. 26, 2016. U.S. patent application Ser. No. 16/336,422 and International Patent Application No. PCT/CN2016/100172 are incorporated herein by reference in their entireties. Priority to U.S. patent application Ser. No. 16/336,422 and International Patent Application No. PCT/CN2016/100172 is claimed.

TECHNICAL FIELD

Embodiments described herein generally relate to boot environments of a processor and in particular to techniques for enhancing the security of the boot environment.

BACKGROUND ART

The boot process of a processor today may involve some silicon initialization code provided by the chip manufacturer and other initialization code provided by an Original Equipment Manufacturer (OEM), both of which execute before an operating system is loaded and begins execution. The silicon initialization procedure typically starts with executing the chip manufacturer silicon initialization code followed by the OEM silicon initialization code. A handoff of data occurs between the chip manufacturer silicon initialization code and the OEM silicon initialization code.

Today, the chip manufacturer silicon initialization code and the OEM silicon initialization code, as well as the handoff of data is typically done "in the clear," which can allow access to the binary content both of the silicon initialization code and the handoff of data. Such access makes protection of the intellectual property contained in the silicon initialization code difficult and offers opportunity for malware to perturb the boot process.

While some efforts have been made to allow for encryption of the chip manufacturer's silicon initialization firmware, there has been no way to allow encryption of the OEM silicon initialization code or the data handed off between the chip manufacturer's silicon initialization code and the OEM silicon initialization code. For example, the Unified Extensible Firmware Interface (UEFI) forum has defined an interface called the Hardware Security Testability Interface (HSTI) that is produced by the chip manufacturer's silicon initialization code and is intended to be non-modifiable by OEM's who integrate the HSTI. However, the chip manufacturer's silicon initialization code may expose many details on the secure configuration register of the processor chip and OEMs may override the HSTI or reverse engineer the HSTI to learn information that the chip manufacturer would prefer to keep hidden.

The UEFI specification secure boot today entails operating system (OS) vendors OS loaders being signed by not encrypted. Similarly UEFI trust anchors are stored as authenticated or signed variables. While such signing techniques may provide integrity protection, they do not provide confidentiality.

Other concerns with the openness of existing code and data exist. For example, Advanced Configuration and Power Interface (ACPI) handoff tables are currently exposed in clear text and may be avenues for attack. In another example, Updatable Product Data (UPD) can be configured by the user, but attacks on the configuration process are possible.

A more secure boot procedure that allowed not just integrity protection but also allowed confidentiality of pre-boot code and data would be desirable.

DESCRIPTION OF EMBODIMENTS

Figure 1:
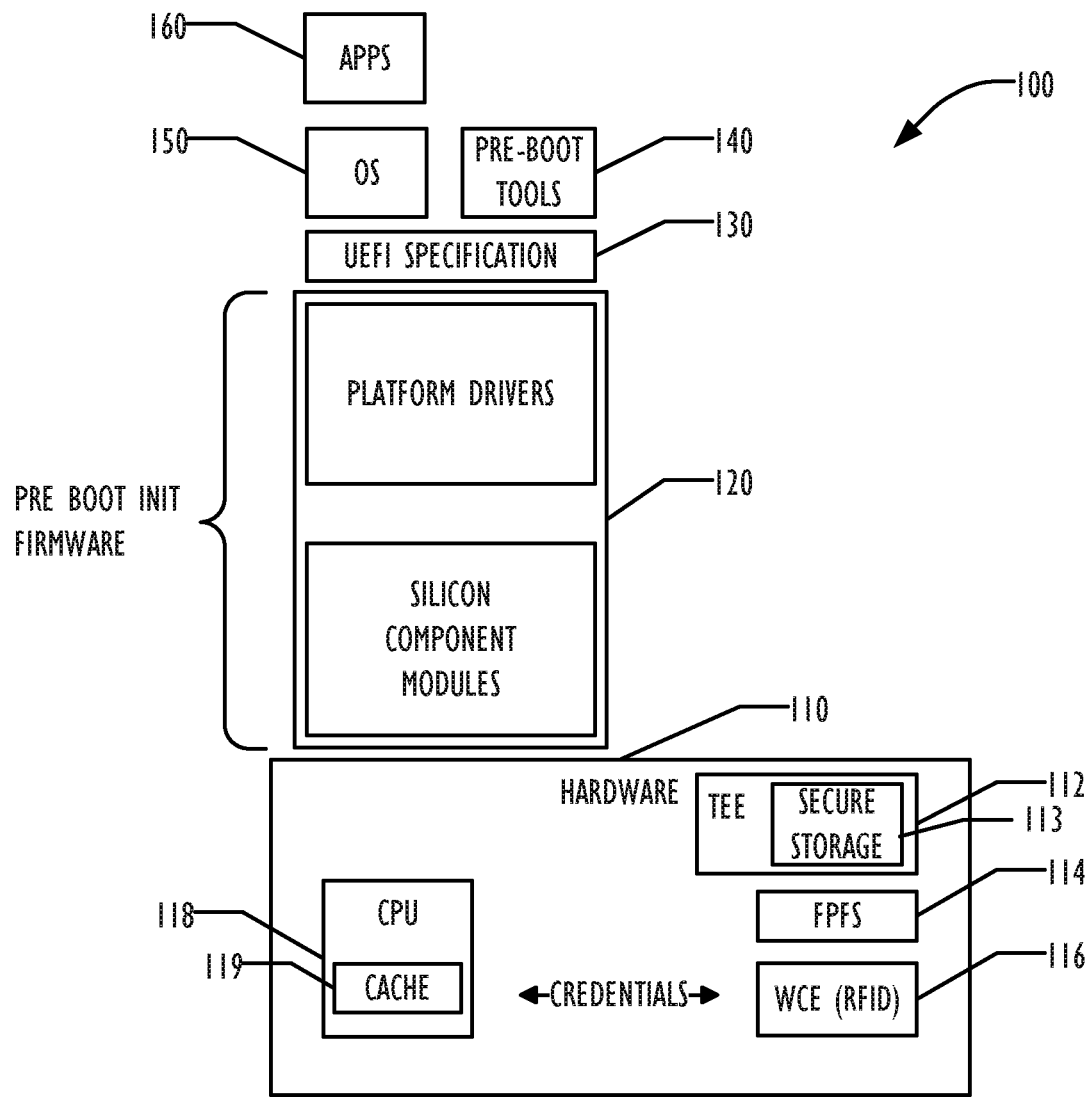
FIG. 1 is a block diagram illustrating an architecture for a computing system capable of an enhanced secure boot according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

As used herein, the term "firmware" means software programmed into a firmware device by a manufacturer or an OEM. Firmware may be used for initialization of the computer or may provide operational functionality, and may include both code and data.

As used herein, a "firmware device" is a persistent physical repository that contains firmware, typically as a device that is read-only under normal operations, but which may be updated under special conditions. A firmware device is typically a flash component but may be some other type of persistent storage. A single physical firmware device may be divided into smaller pieces to form multiple logical firmware devices. Similarly, multiple physical firmware devices may be aggregated into one larger logical firmware device.

As used herein, a "firmware volume" is a logical firmware device. The basic storage repository for firmware data and/or code is the firmware volume. Each firmware volume is organized into a file system. As such, the file is the base unit of storage for firmware.

Embodiments described below provide a novel combination of key hierarchies and flows, providing a more robust processor environment. Embodiments described below address the problem of combining an OEM firmware with a chip manufacturer authorized binary, including occluding access to the binary content, enabling both the chip manufacturer and OEMs to encrypt their early initialization code. A secure enclave is created immediately after reset of the processor and used for the chip manufacturer's early initialization code. A second enclave is created in dynamic random access memory (DRAM) for use by the OEM initialization code, and an encrypted handoff block (eHOB) is used to provide a secure handoff of data between enclaves.

Thus, for example, by putting HSTI in an enclave or a validated encrypted firmware launched from the enclave, hiding the HSTI details, and encrypting the output from the enclave so that only trusted entities can decrypt the output from the enclave, the security posture of the machine is only exposed to those trusted parties.

UEFI secure boot today entails OS vendors' operating loaders being signed but not encrypted. By allowing for both the chip manufacturer's initialization code and the OEM's initialization code to be encrypted, transitive trust can be applied to the operating loaders, too. For a lock-down Internet of Things (IOT) device or other appliances, systems employing the disclosed techniques can provide a differentiated trust assertion for the chip manufacturer's platforms while preserving the openness of the business-to-business integration.

Trust anchors in today's UEFI are stored as authenticated or signed variables, but are not encrypted. By employing enclaved-based flows to host the UEFI variable driver, we can allow for encryption of those variables, thus providing both integrity and confidentiality of the variables. For example, OEMs today may use UEFI variables for assets like passwords that need encryption but there are relatively few encryption capabilities exposed to the OEM or chip manufacturer firmware flows.

The disclosed techniques could also be used to protect ACPI hand-off tables that are currently exposed in plain text.

In some embodiments, where preconfigured default values of Updatable Product Data can be overwritten during boot at runtime by user configuration, such as memory configuration, Pre-Boot Authentication pass phrases, server memory hot-plug MRC configuration in clear. With the flows described below, this can be secured using Trusted I/O with an early enclave in the pre-boot environment.

FIG. 1 is a block diagram that illustrates an architecture 100 for a computer system that can provide secure boot according to one embodiment. Hardware 110 illustrates the hardware of the computer system, including CPU 118. Firmware 120 provides routines for initializing and configuring the hardware 110. A Unified Extensible Firmware Interface (UEFI) layer 130 defines an interface between the firmware 120 and a UEFI-enabled operating system (OS) 150. A collection of pre-boot tools 140 may also interface to the UEFI layer 130. Application software 160 may run on the hardware 110 under the control of the OS 150 after initialization of the hardware 110 and booting of the OS 150.

The hardware 110 includes a CPU or processing element unit 118, which contains a processor cache 119. Instructions provided to the CPU by the firmware, OS, or application software when executed by the CPU cause the CPU to perform the programmed actions. A Trusted Execution Environment (TEE) 112 may provide a secure area for execution of authenticated code, and may include protected memory 113 not accessible to the OS 150 or application software 160. A collection of field programmable fuses (FPFs) 114 provide an area of non-volatile storage that may be used as described below by chip manufacturers and OEMs. Any number of FPFs may be provided by the manufacturer of the processor chip. A wireless credential exchange (WCE) capability 116 provides the ability to use a radio-frequency identification chip to perform additional configuration from the factory floor to the user under secure conditions.

The discussion below generally relates to the pre-boot firmware 120, which provides a way for a hardware manufacturer and an OEM, each of which may have their own firmware routines, to provide a secure way for the manufacturer's firmware to pass information to the OEM firmware. However, additional features, such as a secure way to allow secure user configuration input at pre-boot time, as well as a secure way to allow field configuration using WCE capability 116, are also described.

Figure 2:
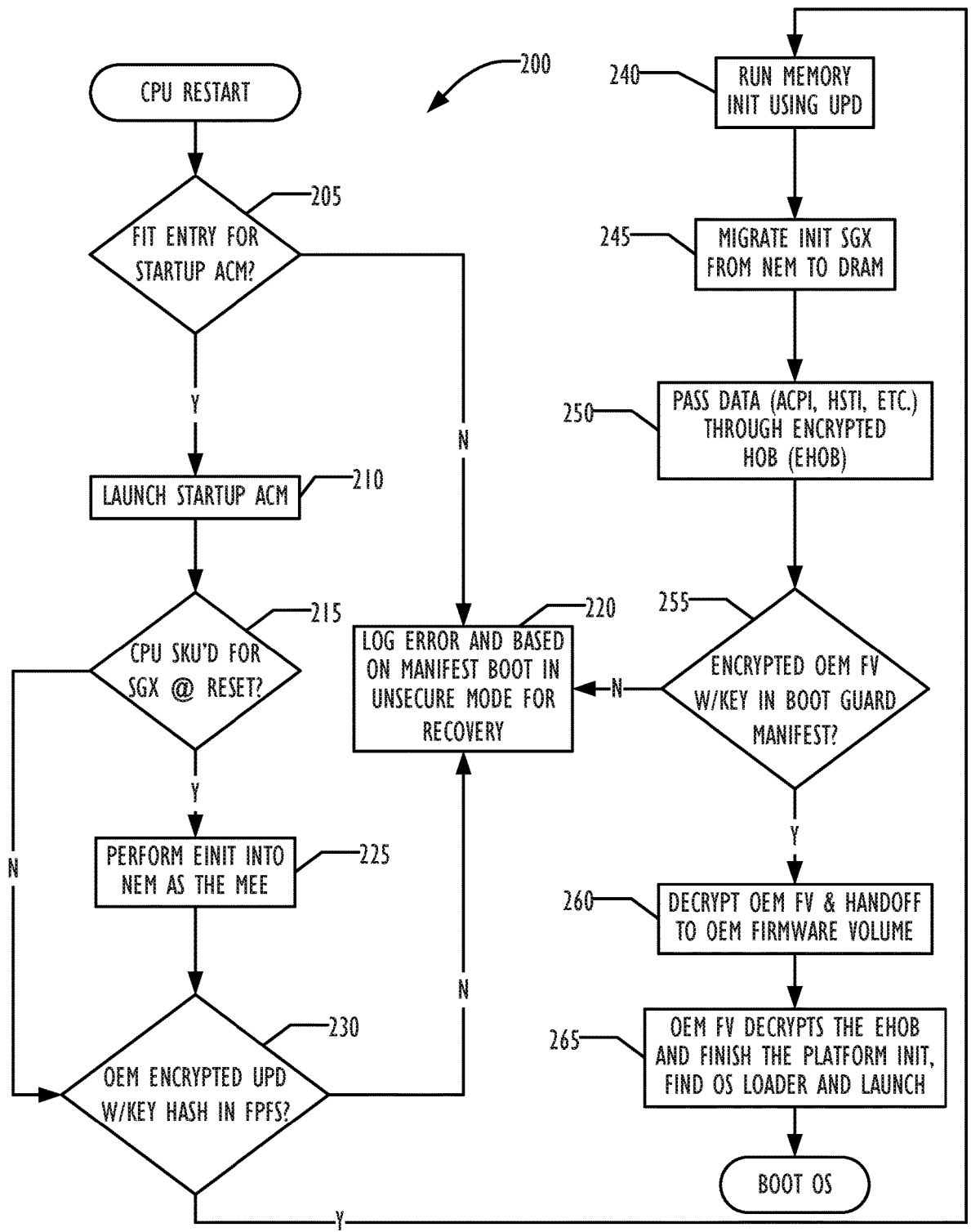
FIG. 2 is a flowchart illustrating a technique for an enhanced secure boot according to one embodiment.

FIG. 2 is a flowchart illustrating a technique 200 for performing an enhanced secure boot according to one embodiment. Upon restart of the CPU, the processor on-die microcode locates the Firmware Interface Table (FIT) at a predetermined location. In some embodiments, the FIT is located at a fixed address of 4 GB-0x40. The FIT provides pointers to startup firmware routines. In some embodiments, the startup firmware routines may comprise Intel Firmware Support Package (FSP) routines. In a typical environment, the startup firmware routine address is found at a predetermined fixed offset into the FIT.

In block 205, the location pointed to by the FIT is checked to determine whether the startup firmware routine is a startup Authenticated Code Module (ACM), i.e., a routine that has been signed by the manufacturer. If the FIT points to something other than a startup ACM, then in block 220 the secure boot procedure may log an error and boot in an unsecure mode for recovery. In some embodiments, any unexpected behavior may be logged and provisioned policy-based actions may be taken responsive to the logged unexpected behavior. If the FIT does point to a startup ACM, the startup ACM is launched in block 210. At this stage, the startup ACM typically allocates temporary memory to use until permanent memory becomes available from processor cache. In some embodiments, the startup ACM is a routine that may load other firmware routines as needed or desired.

In block 215, the startup ACM determines whether the processing element is capable of creating memory enclaves during reset processing. Some processing elements may be incapable of creating such enclaves. If not, no enclave is created and the startup ACM may be a signed ACM, but not an encrypted ACM.

If the processing element is capable of creating enclaves during reset processing, then an enclave is created and code is loaded into the enclave. In some embodiments, the enclave is created using the Intel SGX instruction set ECREATE instruction with the enclave created in the processor cache, such as the cache 472/482 of FIG. 4. The processing element preferably operates in no-evict mode (NEM) while using the cache as memory. As the startup ACM is loaded into the enclave memory, a memory encryption engine (MEE) of the processing element decrypts the startup ACM as the ACM code enters the processing element and encrypts it as the code leaves the processing element using the manufacturer's private key.

Once the enclave is created and started in block 225, such as with the SGX EINIT instruction, the ACM can execute in the enclave to perform silicon initialization and other functions desired by the manufacturer.

In block 230, the startup ACM may determine whether OEM encrypted UPD is available and whether the key is available in field programmable fuses of the processor chip. If available, the UPD is decrypted in the enclave and used to initialize the main memory of the computer in block 240. This main memory is typically DRAM, but may be any type of memory available to the manufacturer. If no OEM encrypted UPD is found, some embodiments may consider that an error or warning condition and an appropriate policy-based action may be taken, as illustrated in block 220, resulting actions such as a boot to recover mode or a failure to boot with a user warning, etc. Other embodiments may take other actions in the event no OEM encrypted UPD is found.

Once the main memory is available and initialized, the startup ACM creates an enclave in main memory and migrates the startup ACM from the cache memory enclave to the main memory enclave in block 245.

In block 250, data that is to be passed to an OEM firmware is stored in a handoff block (HOB), then is encrypted as an encrypted HOB (eHOB) using the OEM encryption key obtained from the FPFs. Although typically the encryption is performed using a symmetric encryption algorithm, asymmetric encryption techniques may be used, with an OEM public key used for creating the eHOB. Embodiments may use any desired data structures for the eHOB.

In block 255, the startup ACM code—now running in the enclave in main memory, instead of the processor cache—looks for an encrypted OEM firmware volume. In some embodiments, the OEM firmware volumes are listed in a manifest maintained by a management engine hardware. Although conventionally OEM firmware volumes are signed using the OEM public key stored in the FPFs, embodiments described herein allow encryption of the OEM firmware volumes using the OEM's private key. If no encrypted OEM firmware volume is found, then the startup ACM considers that an error condition and passes control to block 220, described above.

In block 260, the startup ACM code running in the enclave decrypts the OEM firmware volume and hands off control to the OEM firmware volume, passing the OEM firmware volume the eHOB created in block 250. The OEM firmware volume may then decrypt the eHOB and obtain the handoff data for use by the OEM firmware contained in the OEM firmware volume in block 265. The OEM firmware may then complete initialization of the computer, find the loader for the OS, and launch the loader. The initialization then completes as the OS boots.

By running both the manufacturer firmware and the OEM firmware in an enclave, and by passing data from the manufacturer firmware to the OEM firmware in an eHOB, both the manufacturer firmware and the OEM firmware may be protected from modification and protected from inspection and the handoff data may also be protected from both modification and inspection, so that only trusted entities can decrypt the firmware and data, ensuring that the security posture of the machine is only exposed to trusted parties.

In some embodiments, a pre-boot authentication process prevents use of the computer until the user has provided a correct password or other credentials. In other embodiments, a user may be able to provide system configuration information at pre-boot time. In both situations, hardening the user input process would be advantageous. By using the secure storage and capabilities of a trusted execution environment (TEE) 112, such as an Intel Manageability Engine, for handling the I/O with a user input device, such as a keyboard, and a user output device, such as a display, then establishing a secure channel from the TEE to the enclave used by the pre-boot startup ACM, we can ensure that no software could observe the input entry by the user or the information displayed for the user.

Figure 3:
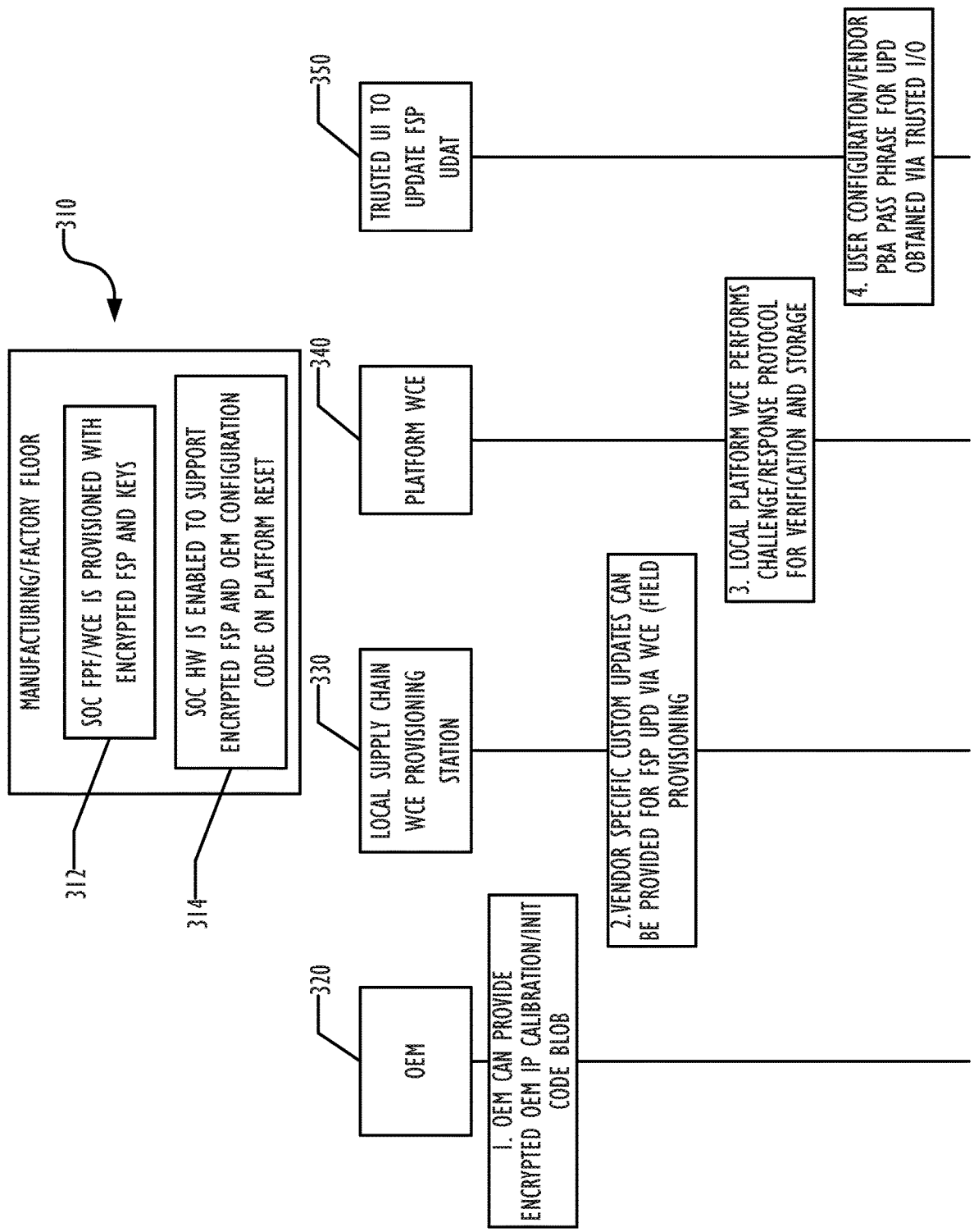
FIG. 3 is a swimlane chart illustrating a technique for securely provisioning a computing device according to one embodiment.

In another embodiment, illustrated by FIG. 3, another feature of the architecture described in FIG. 1 can be used to allow multiple secure configurations events. A passive radio frequency identification (RFID) component 116, typically embedded into the processing element SOC, provides for a wireless credentials exchange (WCE) capability that allows provisioning credentials at various times. At manufacturing time, as illustrated in block 310, the WCE element may be used to provision FPFs and keys in block 312, using an RFID programmer. In block 314, the SOC hardware may then be enabled to support encrypted startup ACM and OEM configuration code that executes on a platform reset, as described above. Preferably, the WCE element 116 is location-aware, allowing geo-fencing control over where the WCE 116 can be accessed and programmed.

In lane 320, an OEM can provision elements such as provisioning keys to the FPFs used by the encrypted OEM startup code described above. Then in a next phase illustrated in lane 330, a vendor or local supply chain, such as a retail outlet, may use the WCE element 116 to provision additional customizations specific to that vendor, such as additional UPD elements. Thus after provisioning by the retailer, the device behavior may be different from what it was during manufacturing. When the device is purchased and registered by the consumer, in lane 340 the WCE element may be used to perform a challenge-response protocol for verification. Finally, in lane 350, trusted I/O, such as provided via the TEE 112 allows the user to provide a pre-boot authentication pass phrase securely, without opening an opportunity for nefarious code on the computer to access the pass phrase.

Figure 4:
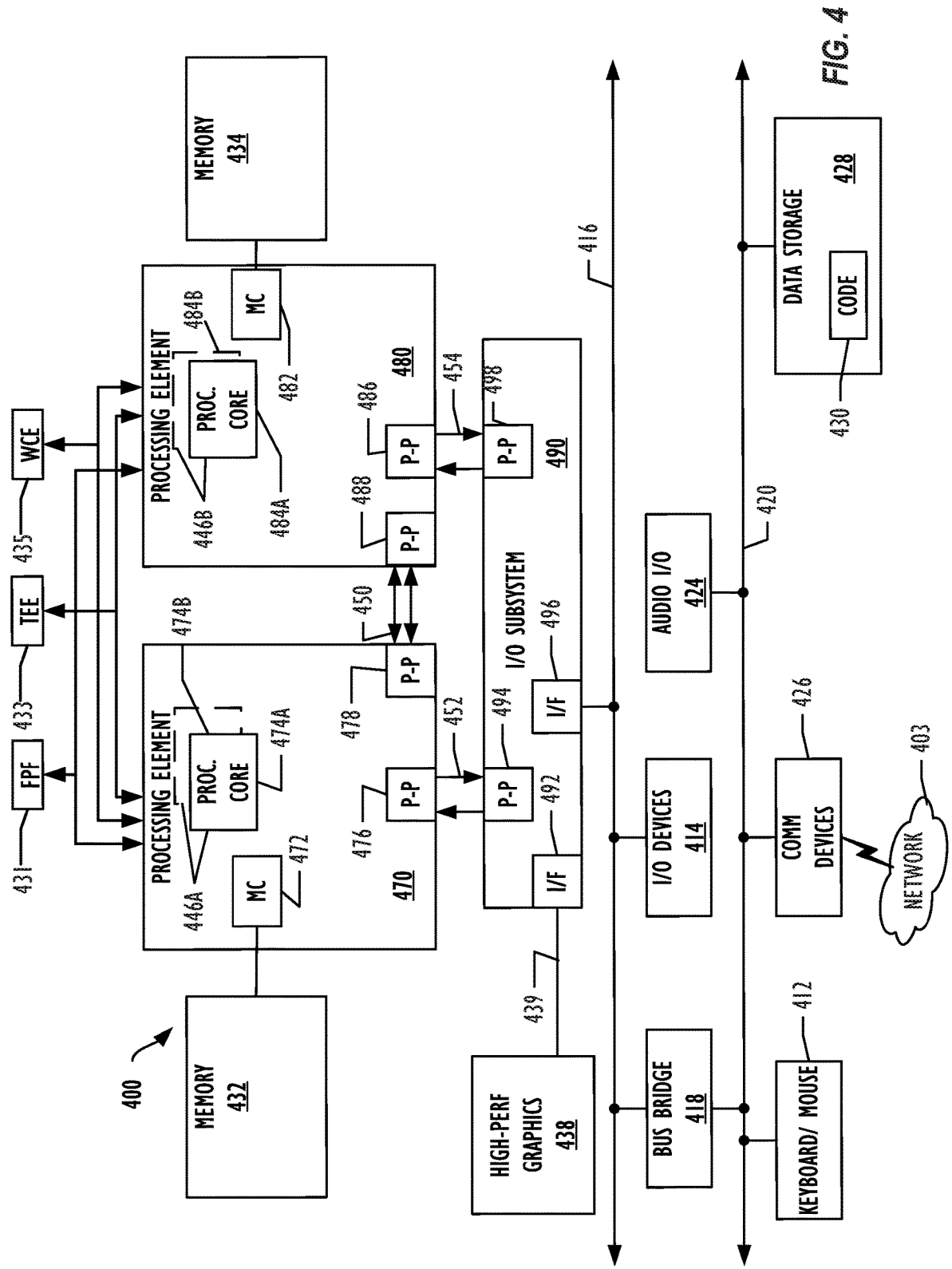
FIG. 4 is a block diagram illustrating a computing device for use with techniques described herein according to one embodiment.

Referring now to FIG. 4, a block diagram illustrates a programmable device 400 that may be used for implementing the techniques described herein in accordance with one embodiment. The programmable device 400 illustrated in FIG. 4 is a multiprocessor programmable device that includes a first processing element 470 and a second processing element 480. While two processing elements 470 and 480 are shown, an embodiment of programmable device 400 may also include only one such processing element.

Programmable device 400 is illustrated as a point-to-point interconnect system, in which the first processing element 470 and second processing element 480 are coupled via a point-to-point interconnect 450. Any or all of the interconnects illustrated in FIG. 4 may be implemented as a multi-drop bus rather than point-to-point interconnects.

As illustrated in FIG. 4, each of processing elements 470 and 480 may be multicore processors, including first and second processor cores (i.e., processor cores 474a and 474b and processor cores 484a and 484b). Such cores 474a, 474b, 484a, 484b may be configured to execute instruction code. However, other embodiments may use processing elements that are single core processors as desired. In embodiments with multiple processing elements 470, 480, each processing element may be implemented with different numbers of cores as desired.

Each processing element 470, 480 may include at least one shared cache 446. The shared cache 446a, 446b may store data (e.g., instructions) that are utilized by one or more components of the processing element, such as the cores 474a, 474b and 484a, 484b, respectively. For example, the shared cache may locally cache data stored in a memory 432, 434 for faster access by components of the processing elements 470, 480. In one or more embodiments, the shared cache 446a, 446b may include one or more mid-level caches, such as level 2 (L2), level 3 (L3), level 4 (L4), or other levels of cache, a last level cache (LLC), or combinations thereof.

While FIG. 4 illustrates a programmable device with two processing elements 470, 480 for clarity of the drawing, the scope of the present invention is not so limited and any number of processing elements may be present. Alternatively, one or more of processing elements 470, 480 may be an element other than a processor, such as an graphics processing unit (GPU), a digital signal processing (DSP) unit, a field programmable gate array, or any other programmable processing element. Processing element 480 may be heterogeneous or asymmetric to processing element 470. There may be a variety of differences between processing elements 470, 480 in terms of a spectrum of metrics of merit including architectural, microarchitectural, thermal, power consumption characteristics, and the like. These differences may effectively manifest themselves as asymmetry and heterogeneity amongst processing elements 470, 480. In some embodiments, the various processing elements 470, 480 may reside in the same die package.

First processing element 470 may further include memory controller logic (MC) 472 and point-to-point (P-P) interconnects 476 and 478. Similarly, second processing element 480 may include a MC 482 and P-P interconnects 486 and 488. As illustrated in FIG. 4, MCs 472 and 482 couple processing elements 470, 480 to respective memories, namely a memory 432 and a memory 434, which may be portions of main memory locally attached to the respective processors. While MC logic 472 and 482 is illustrated as integrated into processing elements 470, 480, in some embodiments the memory controller logic may be discrete logic outside processing elements 470, 480 rather than integrated therein.

Processing element 470 and processing element 480 may be coupled to an I/O subsystem 490 via respective P-P interconnects 476 and 486 through links 452 and 454. As illustrated in FIG. 4, I/O subsystem 490 includes P-P interconnects 494 and 498. Furthermore, I/O subsystem 490 includes an interface 492 to couple I/O subsystem 490 with a high performance graphics engine 438. In one embodiment, a bus (not shown) may be used to couple graphics engine 438 to I/O subsystem 490. Alternately, a point-to-point interconnect 439 may couple these components.

In turn, I/O subsystem 490 may be coupled to a first link 416 via an interface 496. In one embodiment, first link 416 may be a Peripheral Component Interconnect (PCI) bus, or a bus such as a PCI Express bus or another I/O interconnect bus, although the scope of the present invention is not so limited.

As illustrated in FIG. 4, various I/O devices 414, 424 may be coupled to first link 416, along with a bridge 418 that may couple first link 416 to a second link 420. In one embodiment, second link 420 may be a low pin count (LPC) bus. Various devices may be coupled to second link 420 including, for example, a keyboard/mouse 412, communication device(s) 426 (which may in turn be in communication with the computer network 403), and a data storage unit 428 such as a disk drive or other mass storage device which may include code 430, in one embodiment. The code 430 may include instructions for performing embodiments of one or more of the techniques described above. Further, an audio I/O 424 may be coupled to second link 420.

FPFs 431, TEE 433, and WCE element 435 connect to processing elements 470 and 480. Although illustrated as direct point-to-point connections, implementations may connect each of these elements in any desired way.

Note that other embodiments are contemplated. For example, instead of the point-to-point architecture of FIG. 4, a system may implement a multi-drop bus or another such communication topology. Although links 416 and 420 are illustrated as busses in FIG. 4, any desired type of link may be used. In addition, the elements of FIG. 4 may alternatively be partitioned using more or fewer integrated chips than illustrated in FIG. 4.

The programmable device depicted in FIG. 4 is a schematic illustrations of embodiments of programmable devices that may be utilized to implement various embodiments discussed herein. Various components of the programmable devices depicted in FIG. 4 may be combined in a system-on-a-chip (SoC) architecture.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a stand-alone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

The following examples pertain to further embodiments.

Example 1 is a computing system having an enhanced secure boot capability, comprising: a hardware processing element; a set of field programmable fuses, connected to the processing element; firmware programmed to configure the processing element during a pre-boot initialization of the processing element, comprising: a first encrypted firmware routine programmed to perform a first initialization phase of the processing element in a protected enclave upon restart of the processing element, comprising firmware instructions that when executed cause the processing element to: create a handoff data for use by a second initialization phase; encrypt the handoff data with an original equipment manufacturer key provisioned in the set of field programmable fuses; decrypt a second encrypted firmware routine using the original equipment manufacturer key; and pass the encrypted handoff data to the second encrypted firmware routine to perform the second initialization phase of the processing element.

In Example 2 the subject matter of Example 1 optionally includes wherein the first encrypted firmware routine further comprises firmware instructions that when executed cause the processing element to: create the protected enclave in processing element cache memory; execute a first portion of the first encrypted firmware routine in the protected enclave; initialize main memory; create a second protected enclave in main memory; and execute a second portion of the first encrypted firmware routine in the second protected enclave.

In Example 3 the subject matter of Example 1 optionally includes wherein the first encrypted firmware routine further comprises firmware instructions that when executed cause the processing element to: decrypt an original equipment manufacturer updatable product data using the original equipment manufacturer key.

In Example 4 the subject matter of Example 3 optionally includes wherein the first encrypted firmware routine further comprises firmware instructions that when executed cause the processing element to: perform main memory initialization using the decrypted original equipment manufacturer updatable product data.

In Example 5 the subject matter of any of Examples 1-4 optionally includes further comprising: a trusted execution environment; and firmware programmed for execution in the trusted execution environment, comprising instructions that when executed cause the trusted execution environment to: use trusted input/output capabilities of the trusted execution environment to obtain pre-boot authentication information from a user.

In Example 6 the subject matter of any of Examples 1-4 optionally includes further comprising: a wireless credentials exchange component; and firmware programmed for using the wireless credentials exchange component, comprising instructions that when executed cause the wireless credentials exchange component to: receive vendor-specific pre-boot initialization customization information.

In Example 7 the subject matter of Example 6 optionally includes wherein the wireless credentials exchange component and the firmware allows customization of pre-boot authentication behavior at a plurality of supply chain stages.

In Example 8 the subject matter of Example 7 optionally includes wherein the wireless credentials exchange firmware uses geo-fencing to control locations where the customization of pre-boot authentication behavior can be performed.

In Example 9 the subject matter of any of Examples 1-4 optionally includes wherein the second encrypted firmware routine is stored in an original equipment manufacturer firmware volume.

Example 10 is a method of securely booting a computing system, comprising: provisioning a set of field programmable fuses with an original equipment manufacturer key; executing a first encrypted firmware routine in a first initialization phase upon restart of a processing element of the computing system, comprising: creating a handoff data for use by a second initialization phase; encrypting the handoff data with an original equipment manufacturer key provisioned in the set of field programmable fuses; decrypting a second encrypted firmware routine using the original equipment manufacturer key; and passing the encrypted handoff data to the second encrypted firmware routine to perform the second initialization phase of the processing element.

In Example 11 the subject matter of Example 10 optionally includes wherein executing the first encrypted firmware routine further comprises: creating a protected enclave in processing element cache memory; executing a first portion of the first encrypted firmware routine in the protected enclave; initializing main memory; creating a second protected enclave in main memory; and executing a second portion of the first encrypted firmware routine in the second protected enclave.

In Example 12 the subject matter of any of Examples 10-11 optionally includes wherein executing the first encrypted firmware routine further comprises: decrypting an original equipment manufacturer updatable product data using the original equipment manufacturer key.

In Example 13 the subject matter of any of Examples 10-11 optionally includes further comprising: executing a firmware routine in a trusted execution environment, comprising: obtaining pre-boot authentication information from a user using trusted input/output capabilities of the trusted execution environment.

In Example 14 the subject matter of any of Examples 10-11 optionally includes further comprising: executing firmware for a wireless credentials exchange component of the computing system, comprising: receiving vendor-specific pre-boot initialization customization information.

In Example 15 the subject matter of any of Examples 10-11 optionally includes further comprising: reading the second encrypted firmware routine from an original equipment manufacturer firmware volume.

Example 16 is a machine readable medium, on which are stored firmware instructions for providing an enhanced secure boot of a processing element of a computing system, comprising firmware instructions that when executed cause the processing element to: execute a first encrypted firmware routine programmed to perform a first initialization phase of the processing element in a protected enclave upon restart of the processing element, comprising firmware instructions that when executed cause the processing element to: create a handoff data for use by a second initialization phase; encrypt the handoff data with an original equipment manufacturer key provisioned in a set of field programmable fuses; decrypt a second encrypted firmware routine using the original equipment manufacturer key; and pass the encrypted handoff data to the second encrypted firmware routine to perform the second initialization phase of the processing element.

In Example 17 the subject matter of Example 16 optionally includes wherein the first encrypted firmware routine further comprises firmware instructions that when executed cause the processing element to: create the protected enclave in processing element cache memory; execute a first portion of the first encrypted firmware routine in the protected enclave; initialize main memory; create a second protected enclave in main memory; and execute a second portion of the first encrypted firmware routine in the second protected enclave.

In Example 18 the subject matter of any of Examples 16-17 optionally includes wherein the first encrypted firmware routine further comprises firmware instructions that when executed cause the processing element to: decrypt an original equipment manufacturer updatable product data using the original equipment manufacturer key.

In Example 19 the subject matter of any of Examples 16-17 optionally includes wherein the first encrypted firmware routine further comprises firmware instructions that when executed cause the processing element to: perform main memory initialization using the decrypted original equipment manufacturer updatable product data.

In Example 20 the subject matter of any of Examples 16-17 optionally includes further comprising: a trusted execution environment; and firmware programmed for execution in the trusted execution environment, comprising instructions that when executed cause the trusted execution environment to: use trusted input/output capabilities of the trusted execution environment to obtain pre-boot authentication information from a user.

In Example 21 the subject matter of any of Examples 16-17 optionally includes further comprising: a wireless credentials exchange component; and firmware programmed for using the wireless credentials exchange component, comprising instructions that when executed cause the wireless credentials exchange component to: receive vendor-specific pre-boot initialization customization information.

In Example 22 the subject matter of any of Examples 16-17 optionally includes wherein the second encrypted firmware routine is stored in an original equipment manufacturer firmware volume.

In Example 23 the subject matter of any of Examples 16-17 optionally includes wherein the instructions further comprise instructions that when executed cause the processing element to: log pre-boot actions; and take provisioned policy-based actions responsive to unexpected pre-boot behavior.

Example 24 is a processing element having an enhanced secure boot capability, comprising: means for executing a first encrypted firmware routine programmed to perform a first initialization phase of the processing element in a protected enclave upon restart of the processing element, comprising: means for creating a handoff data for use by a second initialization phase; means for encrypting the handoff data with an original equipment manufacturer key provisioned in a set of field programmable fuses; means for decrypting a second encrypted firmware routine using the original equipment manufacturer key; and means for passing the encrypted handoff data to the second encrypted firmware routine to perform the second initialization phase of the processing element.

In Example 25 the subject matter of Example 24 optionally includes wherein the first encrypted firmware routine further comprises: means for creating the protected enclave in processing element cache memory; means for executing a first portion of the first encrypted firmware routine in the protected enclave; means for initializing main memory; means for creating a second protected enclave in main memory; and means for executing a second portion of the first encrypted firmware routine in the second protected enclave.

In Example 26 the subject matter of any of Examples 24-25 optionally includes wherein the first encrypted firmware routine further comprises: means for decrypting an original equipment manufacturer updatable product data using the original equipment manufacturer key.

In Example 27 the subject matter of any of Examples 24-25 optionally includes wherein the first encrypted firmware routine further comprises: means for performing main memory initialization using the decrypted original equipment manufacturer updatable product data.

In Example 28 the subject matter of any of Examples 24-25 optionally includes further comprising: a trusted execution environment; and firmware programmed for execution in the trusted execution environment, comprising: means for using trusted input/output capabilities of the trusted execution environment to obtain pre-boot authentication information from a user.

In Example 29 the subject matter of any of Examples 24-25 optionally includes further comprising: a wireless credentials exchange component; and firmware programmed for using the wireless credentials exchange component, comprising: means for receiving vendor-specific pre-boot initialization customization information.

In Example 30 the subject matter of any of Examples 24-25 optionally includes wherein the second encrypted firmware routine is stored in an original equipment manufacturer firmware volume.

In Example 31 the subject matter of any of Examples 16-17 optionally includes wherein further comprising: means for logging pre-boot actions; and means for taking provisioned policy-based actions responsive to unexpected pre-boot behavior.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An apparatus comprising:
   memory; and
   at least one processor to execute first instructions, the first instructions obtained from first encrypted firmware, the at least one processor to:
   encrypt handoff data with an original equipment manufacturer key to generate encrypted handoff data;
   decrypt second encrypted firmware based on the original equipment manufacturer key to generate second instructions; and
   provide access to the encrypted handoff data to the second instructions, the second instructions to perform initialization of a computer based on the handoff data obtained from the encrypted handoff data.

2. The apparatus of claim 1, wherein the at least one processor is to execute the second instructions to launch an operating system loader.

3. The apparatus of claim 1, wherein the at least one processor is to execute on-die microcode to locate the first encrypted firmware.

4. The apparatus of claim 1, wherein the at least one processor is to locate the second encrypted firmware based on an original equipment manufacturer firmware volume.

5. The apparatus of claim 1, wherein the processor is to:
   create a first enclave in processor cache;
   load the first encrypted firmware in the first enclave; and
   execute the first instructions in the first enclave before the encrypting of the handoff data.

6. The apparatus of claim 5, wherein the processor is to:
   create a second enclave in main memory; and
   execute the first instructions in the second enclave.

7. The apparatus of claim 1, wherein the original equipment manufacturer key is represented in one or more programmable fuses.

8. At least one machine readable storage device comprising first encrypted firmware that, when decrypted, provide first instructions to cause at least one processor to at least:
   encrypt handoff data with an original equipment manufacturer key to generate encrypted handoff data;
   decrypt second encrypted firmware based on the original equipment manufacturer key to generate second instructions; and
   provide access to the encrypted handoff data to the second instructions, the second instructions to perform initialization of a computer based on the handoff data obtained from the encrypted handoff data.

9. The at least one machine readable storage device of claim 8, wherein the first instructions are to cause the at least one processor to execute the second instructions to launch an operating system loader.

10. The at least one machine readable storage device of claim 8, wherein the first instructions are to cause the at least one processor to locate the second encrypted firmware based on an original equipment manufacturer firmware volume.

11. The at least one machine readable storage device of claim 8, wherein the first instructions are to be executed by the at least one processor in a first enclave in processor cache before the encrypting of the handoff data.

12. The at least one machine readable storage device of claim 11, wherein the first instructions are to be executed by the at least one processor in a second enclave in main memory during the encrypting of the handoff data and the decrypting of the second encrypted firmware.

13. The at least one machine readable storage device of claim 8, wherein the first instructions are to cause the at least one processor to obtain the original equipment manufacturer key from one or more programmable fuses.

14. A method comprising:
    encrypting, by executing first instructions with at least one processor, handoff data with an original equipment manufacturer key to generate encrypted handoff data, the first instructions obtained from first encrypted firmware;
    decrypting, by executing the first instructions with the at least one processor, second encrypted firmware based on the original equipment manufacturer key to generate second instructions; and
    executing the second instructions by the at least one processor to perform initialization of a computer based on the handoff data obtained from the encrypted handoff data.

15. The method of claim 14, further including launching, by executing the second instructions with the at least one processor, an operating system loader.

16. The method of claim 14, further including executing on-die microcode by the at least one processor to locate the first encrypted firmware.

17. The method of claim 14, further including locating the second encrypted firmware based on an original equipment manufacturer firmware volume.

18. The method of claim 14, wherein the executing of the first instructions by the at least one processor is in a first enclave in processor cache before the encrypting of the handoff data.

19. The method of claim 18, wherein the executing of the first instructions by the at least one processor is in a second enclave in main memory during the encrypting of the handoff data and the decrypting of the second encrypted firmware.

20. The method of claim 14, further including obtaining the original equipment manufacturer key from one or more programmable fuses.

* * * * *